United States Patent [19]

Imura

[11] Patent Number: 6,091,770
[45] Date of Patent: Jul. 18, 2000

[54] IMAGE CODING AND DECODING METHOD AND RELATED APPARATUS

[75] Inventor: Koji Imura, Yokohama, Japan

[73] Assignee: Matsushita Electric Industrial Co., Ltd., Osaka, Japan

[21] Appl. No.: 08/886,004

[22] Filed: Jun. 30, 1997

[30] Foreign Application Priority Data

Jul. 5, 1996 [JP] Japan ................................ 8-176397

[51] Int. Cl.⁷ .................................................. H04N 7/12
[52] U.S. Cl. ......................... 375/240; 348/409; 348/420
[58] Field of Search .......................... 341/50, 51, 65, 341/67; 348/390, 409–412, 419, 420, 423, 405; 358/261.1, 427; 382/232, 233, 236, 238–239, 244–246; 375/240; H04N 7/30, 7/12

[56] References Cited

U.S. PATENT DOCUMENTS

| | | | |
|---|---|---|---|
| 5,313,203 | 5/1994 | Suu et al. .................................. | 341/50 |
| 5,686,965 | 11/1997 | Auld ....................................... | 348/423 |
| 5,883,672 | 3/1999 | Suzuki et al. ............................ | 348/405 |
| 5,892,548 | 4/1999 | Kim ........................................ | 348/405 |
| 5,892,791 | 4/1999 | Moon ...................................... | 348/419 |
| 5,963,260 | 10/1999 | Bakhmutsky ............................ | 348/420 |
| 5,963,673 | 10/1999 | Kodama et al. ......................... | 382/239 |

FOREIGN PATENT DOCUMENTS

7-30854  1/1995  Japan .

*Primary Examiner*—Richard Lee
*Attorney, Agent, or Firm*—Lowe Hauptman Gopstein Gilman & Berner

[57] ABSTRACT

In a transmitter, a motion detector detects a motion amount of a coded block. A buffer memorizes a detected motion amount. A buffer controller controls the buffer to read the motion amounts in the order opposed to the writing order. A switch selects one of outputs. In a receiver, a sync word detector discriminates first and second sync words. A primary frame memory memorizes an actually decoded image. A secondary frame memory memorizes a predicted image corresponding to the actually decoded image. Memory controllers read out the image information of coding blocks from the corresponding frame memories in an order opposed to the writing order. A switch selects either one of the information of the primary or secondary frame memories.

6 Claims, 6 Drawing Sheets

| SYNC WORD 1 | M 1 | C 1 | M 2 | C 2 | M 3 | C 3 | ...... | M 50 | C 50 | M 51 | C 51 | M 52 | C 52 | M 53 | C 53 | ...... | M 97 | C 97 | M 98 | C 98 | M 99 | C 99 |

| SYNC WORD 2 | M 1 | M 2 | M 3 | M 4 | M 5 | ...... | M 73 | M 74 | M 75 | M 76 | ...... | M 97 | M 98 | M 99 |

FIG. 8

| SYNC WORD 1 | M 1 | C 1 | M 2 | C 2 | M 3 | C 3 | ...... | M 50 | C 50 | M 51 | C 51 | M 52 | C 52 | M 53 | C 53 | ...... | M 97 | C 97 | M 98 | C 98 | M 99 | C 99 |

ERROR ↑ (at C 51)

| SYNC WORD 2 | M 1 | M 2 | M 3 | M 4 | M 5 | ...... | M 73 | M 74 | M 75 | M 76 | ...... | M 97 | M 98 | M 99 |

ERROR ↑ (at M 75)

FIG. 9

IMAGE CODING AND DECODING METHOD AND RELATED APPARATUS

BACKGROUND OF THE INVENTION

1. Field of the Invention

The present invention relates to a dynamic image coding and decoding method and a related apparatus for compressing and expanding digitized dynamic image signals, and more particularly to a method and an apparatus robust against an error occurring during a transmission.

2. Prior Art

Figure 6:
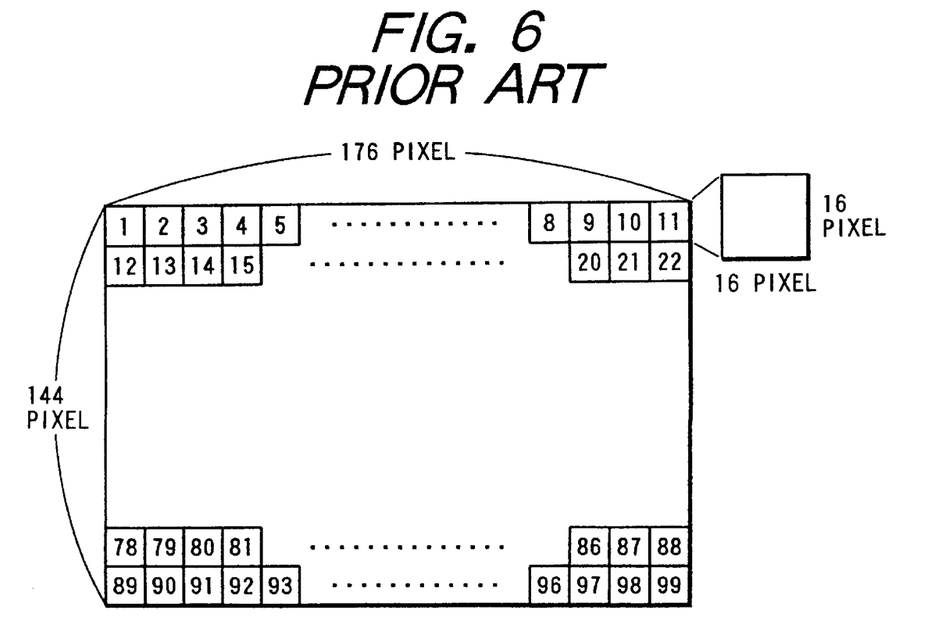
FIG. 6 is a view showing a standard format for a dynamic image.

First, a conventional image coding and decoding method will be explained schematically. A motion compensate/predict coding method and a variable-length coding method are conventionally known as fundamental techniques for coding and decoding dynamic images. A copy information method is a transmitting technique capable of increasing the robustness against a transmission error occurring on a transmission line. FIG. 6 shows a quarter common input format (abbreviated QCIF) which is used worldwide as a standard format for a dynamic image. The quarter common input format shown in FIG. 6 represents a brightness signal of lateral 176 pixels by vertical 144 pixels. In general, an input image is split into a plurality of blocks, each comprising 16 by 16 pixels and serving as units for a coding. Each split block is referred to as macro block. Thus, one frame is constituted by 99 macro blocks.

Next, the motion compensate/predict coding method will be explained. In each macro block, a present macro block is compared with a corresponding image reproduced one frame before to calculate a shift amount of the present macro block in both horizontal and vertical directions relative to the one frame ahead reproduced image. The shift amount, thus obtained, is referred to as a motion vector.

Then, a shift operation is performed independently in each macro block to produce a predicted image. More specifically, the image reproduced one frame before is shifted in the direction parallel to the motion vector of the present macro block by an amount equivalent to the length of this motion vector. Then, the present macro block is replaced by the resultant image, thereby producing the predicted image.

A difference between an actual input image and a corresponding predicted image is calculated in each macro block. The difference thus obtained is referred to as a predicted error. This predicted error is transformed into a frequency region. A discrete cosine transformation is used for this transformation. The discrete cosine transformation factor (hereinafter, referred to as cosine factor) is then quantized and transmitted.

The quantized value is processed through a reverse quantization and a reverse discrete cosine transformation and reconstructed as a predicted error. The predicted error is added to the predicted image. The reproduced image, thus obtained, is used for calculating a motion vector of the next input image as well as producing the predicted image of the next input image.

Next, the variable-length coding operation will be explained. The variable-length coding operation is performed for processing the calculated motion vector value and the quantized cosine factor. Hereinafter, a variable-length coding operation performed on the motion vector will be explained. A occurrence frequency of each motion vector is obtained statistically. A motion vector having a higher occurrence frequency is expressed by a short bit. A motion vector having a lower occurrence frequency is expressed by a large bit. By doing so, it becomes possible as a whole to suppress the total volume of codes to be generated. Similarly, the above-described cosine factors and other control information are processed based on the statistical occurrence frequency, so that the total volume of the generated codes can be suppressed.

Next, the copy information transmission will be explained. The copy information transmission is based on a repetitive transmission of particular information. More specifically, important information required for expressing one frame image is transmitted plural times to prevent the image quality from being deteriorated due to an error generated during a transmission. When the image information transmitted first is not reproduced at a decoder side due to a transmission error, the failed image information is replaced by the corresponding copy information transmitted as important information in the succeeding transmission. Thus, it becomes possible to effectively suppress the deterioration of the image quality.

SUMMARY OF THE INVENTION

In the above-described technical field, a principal object of the present invention is to provide an image coding and decoding method and a related apparatus capable of effectively suppressing a deterioration of the image quality occurring due to a transmission error.

In order to accomplish the above-described and other related objects, the present invention proposes an image coding and decoding method and a related apparatus characterized in that the transmission order of coding blocks is reversed when the coded information involved in an input image is transmitted plural times. This method is effective to suppress the image quality from being deteriorated due to a transmission error. The coded information is based on a variable-length coding. According to the nature of the variable-length coding, the remaining part of the bit string succeeding an occurrence of an error cannot be decoded. Hence, the coding block located at the rearward part of the bit string has a higher possibility of being failed in a decoding operation. In view of the above, when the information involved in the input image is transmitted plural times, an output order of coding blocks transmitted in an N output operation is reversed relative to an output order in an (N−1) output operation. With this arrangement, the information of a coding block, if having a higher possibility of being failed in the decoding operation, can be positioned at a forward position of a bit string. Thus, the present invention increases the possibility that each coding block is decoded properly. This is effective to prevent the deterioration of the image quality.

More specifically, a first aspect of the present invention provides an image coding method comprising the steps of: splitting an input image into a plurality of coding blocks, each serving as units for a coding operation (refer to FIG. 6); performing the coding operation independently in each coding block for variable-length coding information involved in each coding block; and repeating an output operation for outputting all or part of information involved in the coding blocks of the input image in such a manner that an output operation of coding blocks in an N output operation is performed according to an order opposed to an output order in an (N−1) output operation. With this arrangement, it becomes possible to prevent the image quality from being deteriorated due to an error generated in the transmission line.

A second aspect of the present invention provides an image coding method comprising the steps of: decoding an input variable-length coded signal to decode image information involved in each coding block; reconstructing a reproduced image based on the decoded image information involved in each coding block; and receiving information relating to the input image plural times from a transmitter, wherein a decoding operating is performed in such a manner that, in a spatial arrangement, an order of coding blocks entered and decoded in an N input operation is opposed to an order of coding blocks entered and decoded in an (N−1) input operation. With this arrangement, it becomes possible to prevent the image quality from being deteriorated due to an error generated in the transmission line.

A third aspect of the present invention provides an image coding method comprising the steps of: splitting an input image into a plurality of coding blocks, each serving as units for a coding operation; performing the coding operation independently in each coding block for variable-length coding information involved in each coding block; outputting a first sync word accompanied by variable-length coded information of the coding blocks, the first sync word being uniquely recognizable by a decoder; and outputting a second sync word accompanied by variable-length coded information of all or part of information involved in the coding blocks of the image signal, the second sync word being different from the first sync word (refer to FIG. 2), wherein an output operation is performed in such a manner that the information of the coding blocks following the second sync word is output according to an order opposed to an output order of the coding blocks following the first sync word. According to this arrangement, it becomes possible to reverse the output order of micro blocks succeeding the first sync word is reversed in a spatial arrangement relative to the output order of micro blocks succeeding the second sync word.

A fourth aspect of the present invention provides an image decoding method comprising the steps of: detecting first and second sync words different from each other and involved in an input bit string; decoding a variable-length coded information succeeding the first sync word into image information of a plurality of coding blocks; and reconstructing a reproduced image based on the image information of the coding blocks, wherein a decoding operating is performed in such a manner that, in a spatial arrangement, an order of coding blocks decoded after the second sync word is opposed to an order of coding blocks decoded after the first sync word. With this arrangement, it becomes possible to reverse the output order of micro blocks succeeding the first sync word is reversed in a spatial arrangement relative to the output order of micro blocks succeeding the second sync word. The micro block located in a rearward part of the bit string succeeding the first sync word has a higher possibility of being failed in the decoding operation. However, according to the fourth aspect of the present invention, the same micro block is located in a forward part of the other bit string succeeding the second sync word. Accordingly, it becomes possible to reduce the possibility that the decoding operation is failed in both bit strings due to an error. Even if the micro block succeeding the first sync word cannot be decoded due to an error, the failed information can be replaced with a higher possibility by the information decoded in the bit string succeeding the second sync word. Thus, the deterioration of the image quality can be effectively suppressed.

A fifth aspect of the present invention provides an image coding apparatus comprising: a block split means (201) for splitting an input image into a plurality of coding blocks; a coding means (209) for coding information of the input image contained in the coding blocks; a variable-length coding means (213) for converting coded information into variable-length codes; a memory means (205) for memorizing the coded information; a read control means (101) for controlling the memory means to read out information according to an order opposed to a memorized order; a sync word putting means (214) for putting a first sync word on a head of the coded information of the input image as well as putting a second sync word different from the first sync word on the information read out from the memory means; and a switching means (215) for selectively outputting the coded information and the information read out from the memory means. According to the fifth aspect of the present invention, the memory means memorizes the coded information and the read control means controls the memory means to read out the information according to an order opposed to a memorized order. With this cooperation, the information of micro blocks are read out according to an order opposed to an order in a spatial arrangement. Thus, the order of micro blocks succeeding the first sync word can be reversed in the spatial arrangement relative to the order of micro blocks succeeding the second sync word.

A sixth aspect of the present invention provides an image decoding apparatus comprising: a sync word detecting means (220) for detecting first and second sync words different from each other and involved in an input signal; a variable-length decoding means (221) for decoding a variable-length coded string; a decoding means (222) for reconstructing coding blocks based on information involved in the variable-length decoded string; a first memory means (229) for memorizing decoded information of coding blocks corresponding to one frame; a second memory means (225) for memorizing image reproduced one frame before; a control means (102, 103) for controlling the first and second memory means in such a manner that a writing order and a reading order of coding blocks succeeding the first sync word are opposed to a writing order and a reading order of coding blocks succeeding the second sync word; and a switching means (230) for switching a coding block decoded after detecting the first sync word and a coding block decoded after detecting the second sync word. According to the sixth aspect of the present invention, the control means controls the first and second memory means in such a manner that a writing order and a reading order of the coding blocks succeeding a first sync word are opposed to a writing order and a reading order of the coding blocks succeeding a second sync word. When the second sync word is detected, the micro blocks of both the one frame ahead reproduced image and the decoded image can be read out according to the order opposed to an order in spatial arrangement. Furthermore, the switching means switches the coding block decoded after detecting the first sync word and the coding block decoded after detecting the second sync word. Accordingly, when any decoded micro block succeeding the first sync word is subjected to an error, the present invention outputs the corresponding micro block information from the decoded micro block succeeding the second sync word. Thus, it becomes possible to effectively suppressing the deterioration of the image quality.

Reference numerals in parentheses, added in the above description, are merely used for the purpose of expediting the understanding to the present invention and not used for narrowing interpreting the scope of claims of the present invention.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

A preferred embodiment of the present invention will be explained with reference to the accompanying drawing. Identical parts are denoted by the same reference numerals throughout the views.

Fundamental Technology Relating to the Present Invention

A fundamental arrangement for an image coding and decoding apparatus of the present invention will be explained with reference to FIG. 5. In a transmitter shown in FIG. 5, a raster macro block converter 201 converts an input image into a plurality of macro blocks. A motion detector 202 detects a motion vector representing a shift amount of a present macro block based on a comparison between the present macro block image and a corresponding past image. A frame memory 203 stores an image reproduced one frame before and supplies the stored image to the motion detector 202 to detect the motion vector. A memory controller 204 controls the read and write operations of frame memory 203. A buffer 205 stores the motion vector information supplied from the motion detector 202. A buffer controller 206 controls the read and write operations of buffer 205. A subtracter 207 obtains a difference between an output of raster macro block converter 201 and an output of frame memory 203. A discrete cosine transformer 208 transforms an output of subtracter 207 into a frequency region. A quantizer 209 quantizes an output of subtracter 207.

An output of quantizer 209 is sent to a reverse quantizer 210 on one hand. An output of reverse quantizer 210 is processed by a reverse discrete cosine transformer 211. An adder 212 receives an output of reverse discrete cosine transformer 211 and adds it with an output of frame memory 203. On the other hand, the output of quantizer 209 is sent to a variable-length encoder 213 for coding a cosine factor. A sync word generator 214 generates a sync word put on the head of each bit string sent out from the transmitter. A switch 215 selectively connects its movable terminal to motion detector 202 or buffer 205. A variable-length encoder 216 is connected to switch 215 for coding a selected motion vector. A multiplexer 217 is connected to each of variable-length encoder 213, sync word generator 214 and variable-length encoder 216 for multiplexing a coded cosine factor generated from variable-length encoder 213, a coded motion vector generated from variable-length encoder 216, and a sync word generated from sync word generator 214.

Figure 5:
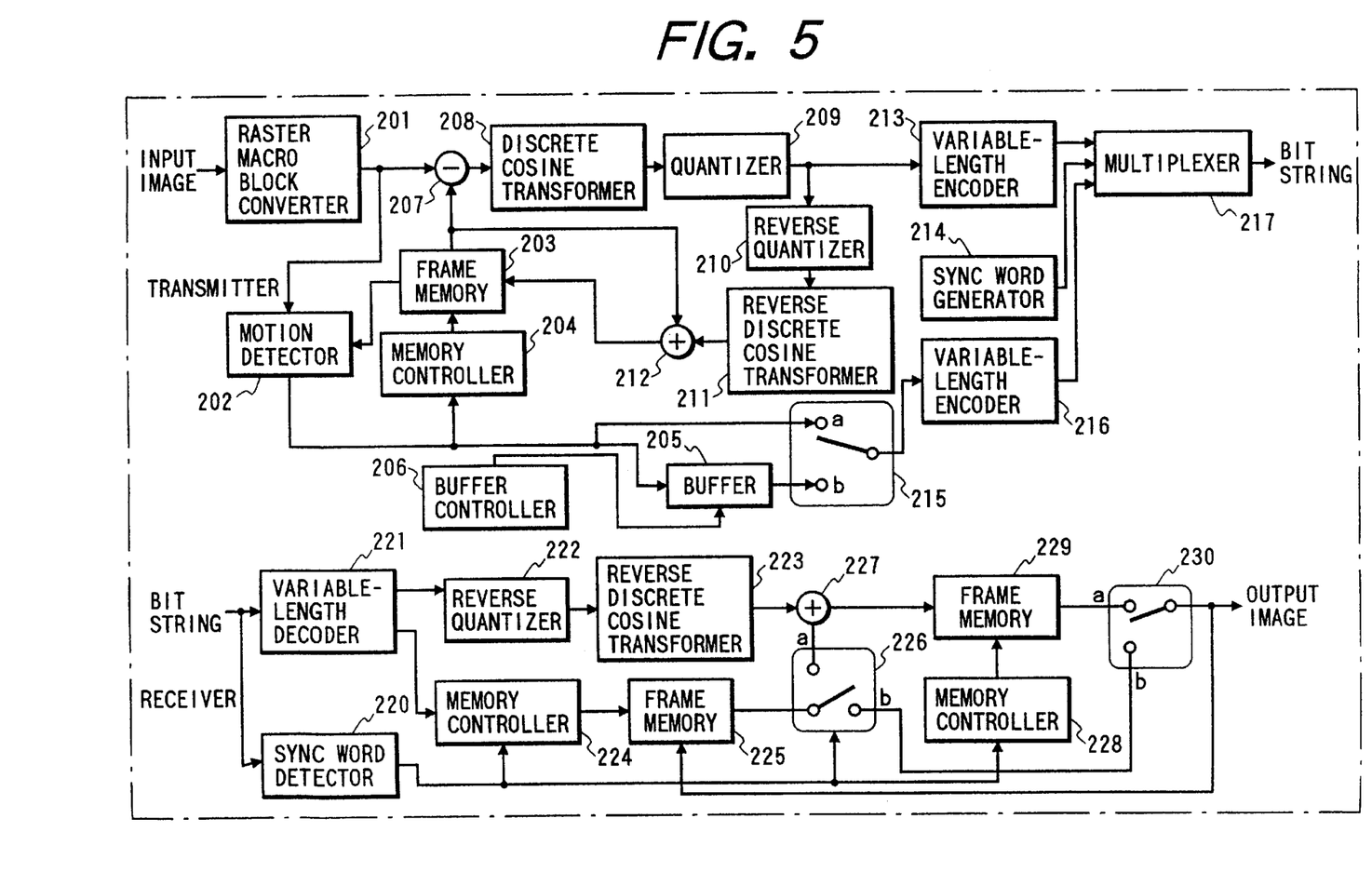
FIG. 5 is a schematic block diagram showing a fundamental arrangement for the image coding and decoding apparatus of the present invention.

A receiver shown in FIG. 5 comprises a sync word detector 220 that detects a type of a sync word involved in a bit string transmitted from the transmitter. A variable-length decoder 221 receives the bit string and decodes the bit string into a decoded cosine factor and a decoded motion vector. A reverse quantizer 222 receives the decoded cosine factor from variable-length decoder 221 and quantizes the same. The quantized output of reverse quantizer 222 is sent to a reverse discrete cosine transformer 223 to reproduce a predicted error.

On the other hand, the decoded motion vector generated from variable-length decoder 221 is sent to a memory controller 224. An output of memory controller 224 is sent to frame memory 225 which stores an image reproduced one frame before. An output of frame memory 225 is sent to a switch 226 which has a movable contact selectively connected to two output terminals. One output terminal of switch 226 is connected to an adder 227. The adder 227 adds an output of frame memory 225 sent through switch 226 with the predicted error produced from reverse discrete cosine transformer 223.

A memory controller 228 is connected to sync word detector 220 to control a frame memory 229 in response to the sync word detected by sync word detector 220. The frame memory 229 stores a reconstructed image. A switch 230 having a movable contact selectively connected to two input terminals one being connected to frame memory 229 and the other connected to the other output terminal of switch 226, thereby selectively outputting either the image stored in frame memory 225 or the image stored in frame memory 229.

Next, operations of various portions in the transmitter shown in FIG. 5 will be explained. Switch 215 is connected to a terminal "a" until a processing for one frame is completely finished. Raster macro block converter 201 converts an input image into a plurality of macro blocks each comprising 16×16 pixels as shown in FIG. 6. Motion detector 202 receives a present macro block from the raster macro block converter 201 and a corresponding stored pixel value from frame memory 203. As explained above, frame memory 203 stores the image reproduced one frame before. Based on these two input data, motion detector 202 produces a motion vector of the present macro block. The resultant motion vector is supplied to each of memory controller 204 and buffer 205. Under a control of buffer controller 206, the motion vectors sent from motion detector 202 are successively written into buffer 205 in order of reception.

Memory controller 204 reads a predicted image from frame memory 203. The predicted image is produced using a motion vector. More specifically, the present macro block is shifted in parallel with the entered motion vector by an amount equivalent to the length of this motion vector. Then, at a thus-shifted position, an image having the same size as the present macro block is read out as a predicted image.

Subtracter 207 calculates a difference (i.e., predicted error) between the actual macro block entered from raster macro block converter 201 and a corresponding predicted image entered from frame memory 203. The obtained predicted error is then transformed into a cosine factor by the discrete cosine transformer 208, and subsequently quantized by the quantizer 209. A quantized output of quantizer 209 is entered into each of variable-length encoder 213 and reverse quantizer 210. The quantized cosine factor is then processed by reverse discrete cosine transformer 211 and then supplied to adder 212. Thus, an output of reverse discrete cosine transformer 211 is added with the predicted image generated from frame memory 203 to form a reproduced image. The frame memory 203 stores the reproduced image for a processing of the next frame.

The quantized cosine factor supplied from quantizer 209 is converted into a variable-length code by variable-length encoder 213, while the motion vector supplied from motion detector 202 is converted into a variable-length code by variable-length encoder 216. A first sync word is produced by sync word generator 214. The multiplexer 217 multiplexes the outputs of variable-length encoder 213, sync word generator 214 and variable-length encoder 216, and produces a multiplexed output with the first sync word put on the heat of one frame comprising both the variable-length coded cosine factor and the variable-length coded motion vector.

After finishing the above-described processing, switch 215 is switched to a terminal "b." Buffer controller 206 reads the motion vector data from the buffer 205 according to the reception order thereof. The readout motion vector is converted into a variable-length code by the variable-length encoder 216. A second sync word, different from the first sync word, is put on the heat of the variable-length coded motion vector. This motion vector is transmitted as copy information. Although this embodiment uses the motion vector as copy information, it is possible to use other information.

Figure 7:
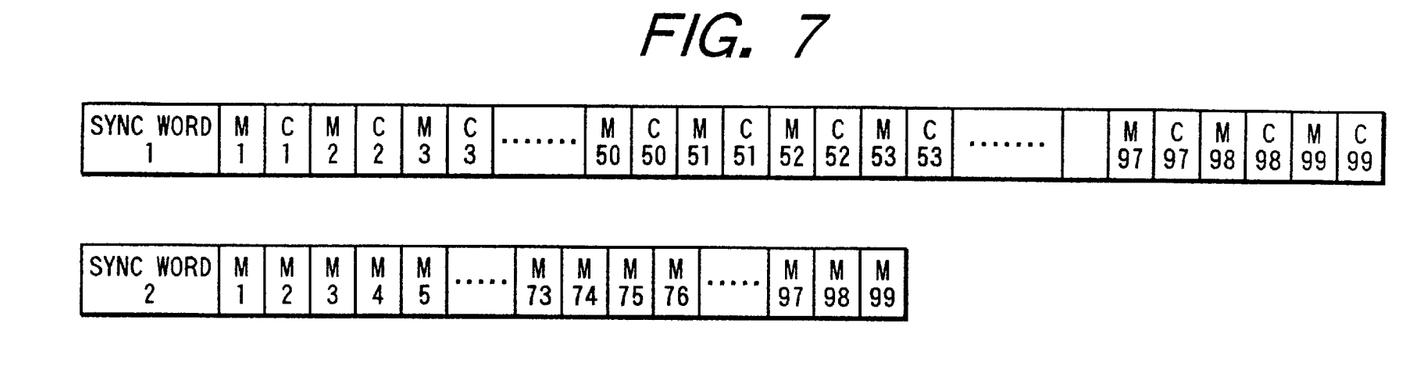
FIG. 7 is an exemplary view showing an arrangement of a bit string reproduced by the system shown in FIG. 5.

An arrangement of image information transmitted by the above-described system will be explained with reference to FIG. 7. In FIG. 7, M1, M2, M3, - - - represent variable-length coded motion vector data and C1, C2, C3, - - - represent variable-length coded cosine factor data. As shown in FIG. 7, the first sync word (i.e., sync word 1) is accompanied by sequentially arranged motion vector data and cosine factor data of first to ninety-ninth macro blocks. As a copy information transmission, the second word (i.e., sync word 2) is accompanied by sequentially arranged motion vector data of first to ninety-ninth macro blocks only.

Next, operations of various portions in the receiver of the system shown in FIG. 5 will be explained. A receivedbit string is entered into each of sync word detector 220 and variable-length decoder 221. When sync word detector 220 detects the first sync word, switch 226 is connected to a terminal "a." When sync word detector 220 detects second sync word, switch 226 is connected to a terminal "b."

A processing, succeeding to the detection of the first sync word, will be explained next. The variable-length decoder 221 produces a decoded cosine factor and a decoded motion vector of each macro block. The decoded cosine factor is sent to reverse quantizer 222 and reverse discrete cosine transformer 223 successively to reproduce the predicted error. On the other hand, the decoded motion vector is entered into memory controller 224. The memory controller 224 controls frame memory 225 to produce an image (predicted image) corresponding to a position shifted from each macro block in parallel with the decoded motion vector by an amount equivalent to the motion vector. The predicted image, thus obtained, is added with the predicted error by adder 227. Under a control of memory controller 228, the added data are written into frame memory 229 in order of reception.

A processing, succeeding to the detection of the second sync word, will be explained next. When the second sync word is detected, switch 226 is connected to a terminal "b." Memory controller 224 controls frame memory 225 to output predicted images corresponding to respective macro blocks successively from first macro block using the motion vector data transmitted as copy information.

Furthermore, memory controller 228 controls frame memory 229 to output reproduced images of the macro blocks successively from the first macro block. Switch 230 selects either the reproduced image from the frame memory 229 or the predicted image from the frame memory 225 according to the following method.

That is, when any macro block reproduced after the detection of the first sync word cannot be decoded due to a transmission error, switch 230 is connected to the frame memory 225 to output the predicted image. The selected images are memorized in frame memory 225 and used for production of a predicted image for the next frame.

As described above, even if a decoding of a certain macro block is failed due to a transmission line error generated after detection of the first sync word, it is possible to replace the failed reproduced image by a corresponding predicted image. Thus, deterioration of image quality can be suppressed effectively. When the motion vector is transmitted as copy information, the predicted image is selected exclusively. However, if the cosine factor is included as part of the copy information, it will become possible to select the reproduced image. No deterioration will be found in the image quality.

Figure 8:
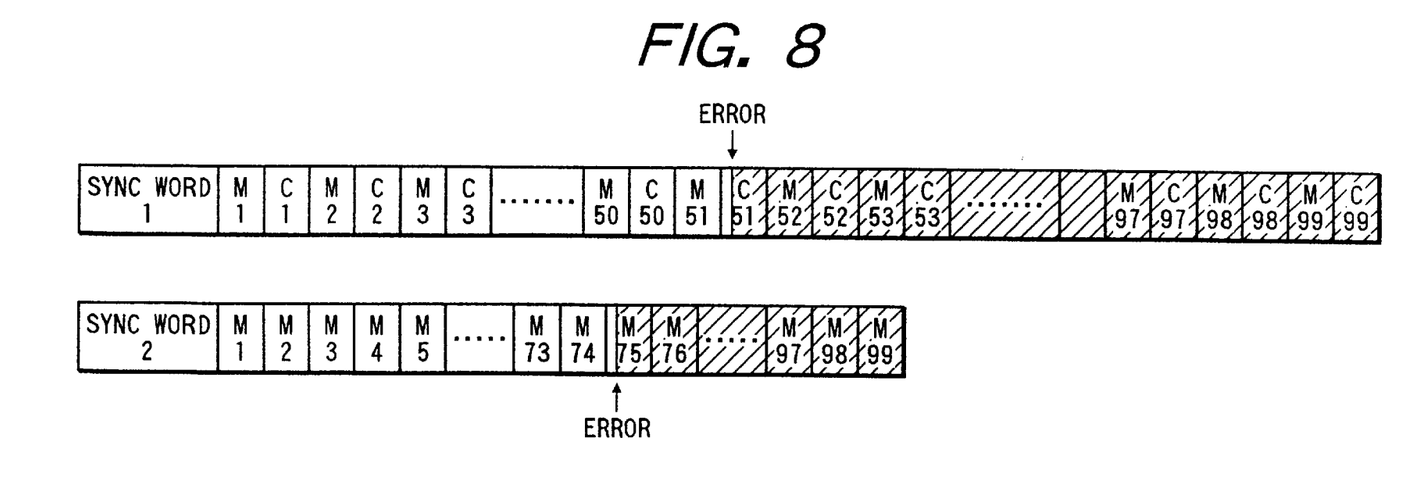
FIG. 8 is a view showing a condition where an error is involved in the bit string shown in FIG. 5.

However, the above-described system comprises the following problems. FIG. 8, like FIG. 7, shows an arrangement of a bit string transmitted from the transmitter of the above-described system wherein an error is involved. From the nature of variable-length codes constituting the bit string, decoding the bit string after an occurrence of an error becomes impossible. According to FIG. 8, the fifty-first macro block is subjected to an error, and the succeeding macro blocks 52–99 are hatched as macro block information that cannot be decoded.

Needless to say, the copy information may also be subjected to an error. As the motion vector is coded by the variable-length code, the bit string following an occurrence of the error cannot be decoded. According to FIG. 8, the seventy-fifth macro block is subjected to an error, and the succeeding macro blocks 76–99 are hatched as a region that is failed in decoding.

Figure 9:
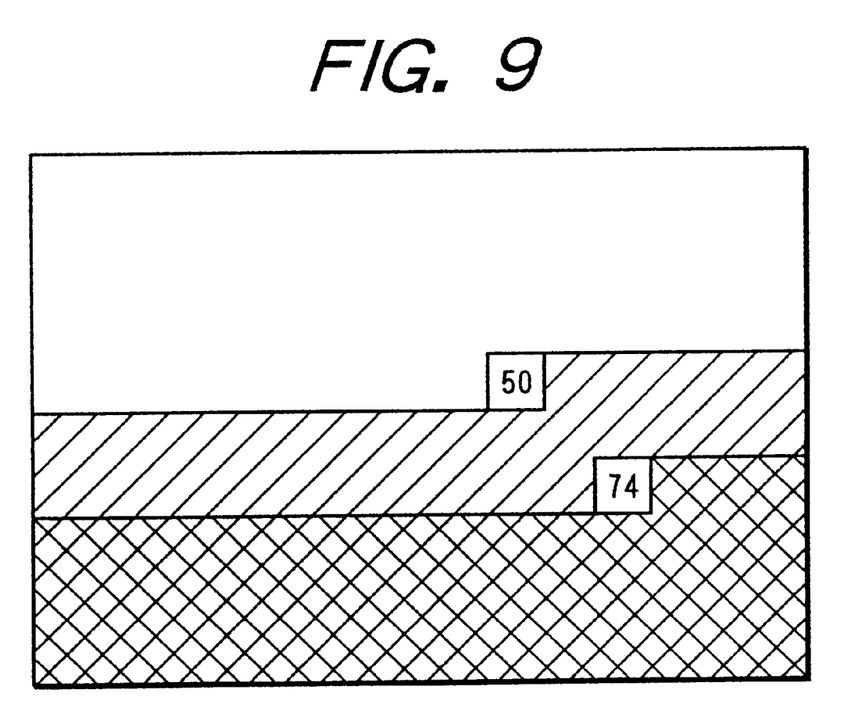
FIG. 9 is a view illustrating a spatial arrangement of a reproduced image comprising a decode-failed region due to a transmission error in the system shown in FIG. 5.

FIG. 9 shows a spatial arrangement of an image reproduced by the system shown in FIG. 5 under the above-described circumstances. A white or vacant region represents macro blocks where the image is decoded properly without any error. A right-ascending hatching region represents macro blocks where the failed image can be replaced by the corresponding predicted image. A left-ascending hatching region represents macro blocks where the decoding operation is failed and no copy information is available.

As described above, there is a possibility that, once an error occurs, the variable-length coded string cannot be decoded at a region following the occurrence of the error. Thus, the possibility that information is accurately decoded is lower in the rearward part of the variable-length coded string than the forward part thereof. This is disadvantageous in that the transmitted information cannot be effectively used.

Preferred Embodiment of the Present Invention

Figure 1:
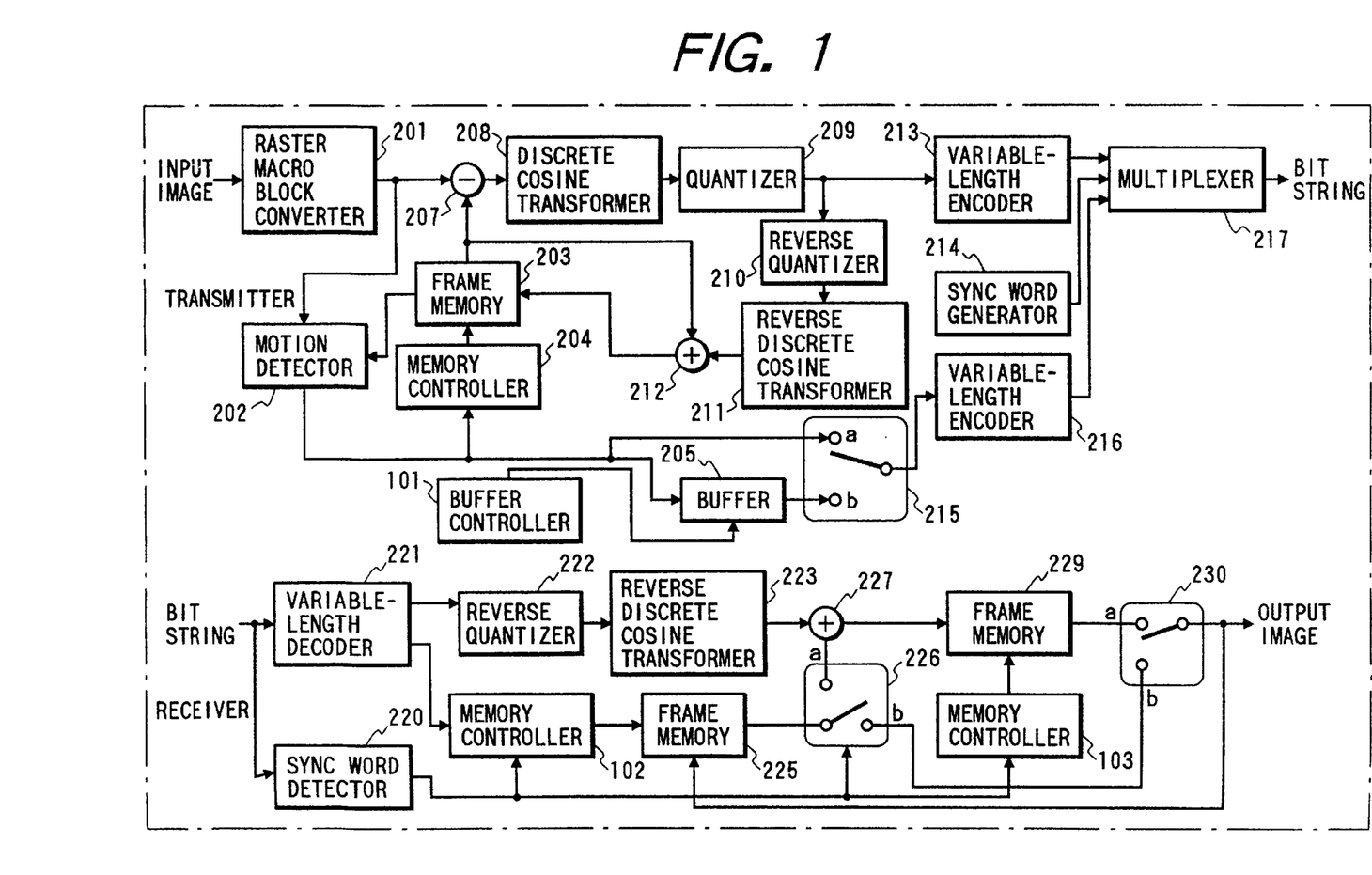
FIG. 1 is a schematic block diagram showing an arrangement of an image coding and decoding apparatus in accordance with a preferred embodiment of the present invention.

Hereinafter, a preferred embodiment of the present invention will be explained with reference to the accompanied drawing. FIG. 1 shows an arrangement of an image coding and decoding apparatus in accordance with a preferred embodiment of the present invention. The arrangement shown in FIG. 1 is basically the same as that disclosed in FIG. 5. The identical parts are denoted by the same reference numerals throughout the view. In a transmitter shown in FIG. 1, a raster macro block converter 201 serves as a block split means for converting an input image into a plurality of macro blocks. A motion detector 202 detects a motion vector representing a shift amount of a present macro block based on a comparison between the present macro block image and a corresponding past image. A frame memory 203 stores an image reproduced one frame before and supplies the stored image to the motion detector 202 to detect the motion vector. A memory controller 204 controls the read and write operations of frame memory 203. A buffer 205, serving as a memory means, stores the motion vector information supplied from the motion detector 202.

A buffer controller 101 serves as a means for controlling the read and write operations of buffer 205. A subtracter 207 obtains a difference between an output of raster macro block converter 201 and an output of frame memory 203. A discrete cosine transformer 208 transforms an output of subtracter 207 into a frequency region. A quantizer 209, serves as a coding means, quantizes an output of subtracter 207.

An output of quantizer 209 is sent to a reverse quantizer 210 on one hand. An output of reverse quantizer 210 is processed by a reverse discrete cosine transformer 211. An adder 212 receives an output of reverse discrete cosine transformer 211 and adds it with an output of frame memory 203. On the other hand, the output of quantizer 209 is sent to a variable-length encoder 213 that serves as a variable-length coding means for coding a cosine factor.

A sync word generator 214, serving as a sync word putting means, generates a sync word put on the head of each bit string sent out from the transmitter. A switch 215, serving as a switching means, selectively connects its movable terminal to motion detector 202 or buffer 205. A variable-length encoder 216 is connected to switch 215 for coding a selected motion vector. A multiplexer 217 is connected to each of variable-length encoder 213, sync word generator 214 and variable-length encoder 216 for multiplexing a coded cosine factor generated from variable-length encoder 213, a coded motion vector generated from variable-length encoder 216, and a sync word generated from sync word generator 214.

A receiver shown in FIG. 1 comprises a sync word detector 220 serving as a sync word detecting means for detecting a type of a sync word involved in a bit string transmitted from the transmitter. A variable-length decoder 221, serving as a variable-length decoding means, receives the bit string and decodes the bit string into a decoded cosine factor and a decoded motion vector. A reverse quantizer 222, serving as a decoding means, receives the decoded cosine factor from variable-length decoder 221 and quantizes the same. The quantized output of reverse quantizer 222 is sent to a reverse discrete cosine transformer 223 to reproduce a predicted error.

On the other hand, the decoded motion vector generated from variable-length decoder 221 is sent to a memory controller 102 that serves as a control means for reversing the writing order and the reading order. An output of memory controller 102 is sent to a frame memory 225 which stores an image reproduced one frame before, as a secondary memory means. An output of frame memory 225 is sent to a switch 226 which has a movable contact selectively connected to two output terminals. One output terminal of switch 226 is connected to an adder 227. The adder 227 adds an output of frame memory 225 sent through switch 226 with the predicted error produced from reverse discrete cosine transformer 223.

A memory controller 103, serving as a control means for reversing the writing order and the reading order, is connected to sync word detector 220 to control a frame memory 229 in response to the sync word detected by sync word detector 220. The frame memory 229 stores a reconstructed image, as a primary memory means. A switch 230 having a movable contact selectively connected to two input terminals one being connected to frame memory 229 and the other connected to the other output terminal of switch 226, thereby selectively outputting either the image stored in frame memory 225 or the image stored in frame memory 229.

The present embodiment is differentiated from the system shown in FIG. 5 by the controls performed in the buffer controller 101, memory controller 102, and memory controller 103. The control of buffer controller 101 is different from that of buffer controller 206 shown in FIG. 5 in that motion vectors are written in buffer 205 in order of entry or reception while these motion vectors are read out according to a reversed order opposed to the writing order. With this control, when the copy information is decoded, the reading order is reversed. More specifically, the motion vectors corresponding to ninety-ninth to first macro blocks are sequentially read out in this order, as they are reversely positioned in the spatial arrangement.

In the same manner, memory controller 102 is responsive to a detection of the first sync word and controls the frame memory 225 to produce the predicted images of first to ninety-ninth macro blocks in this order using the corresponding motion vectors. On the other hand, when the second sync word is detected, the memory controller 102 controls the frame memory 225 to produce the predicted images of ninety-ninth to first macro blocks in this order (i.e., in the opposed order) using the corresponding motion vectors.

In the same manner, memory controller 103 is responsive to the detection of the first sync word and controls the frame memory 229 to write the decoded images according to an order from the first to ninety-ninth macro blocks. On the other hand, when the second sync word is detected, the memory controller 103 controls the frame memory 229 to write the decoded images according to the opposite order from ninety-ninth to first macro blocks. By performing this control, it becomes possible to increase the replaceability of the corresponding copy information for a macro block having a higher probability of being failed in decoding due to an error. As a result, the deterioration of the image quality can be suppressed effectively.

Figure 2:
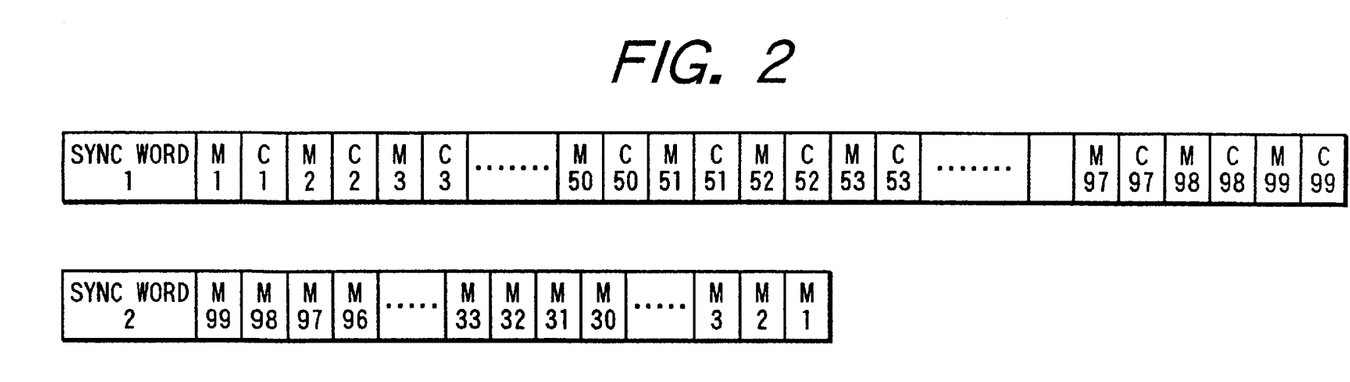
FIG. 2 is an exemplary view showing an arrangement of a bit string reproduced by the system shown in FIG. 1 in accordance with the preferred embodiment of the present invention.

FIG. 2 shows an arrangement of a bit string transmitted by the above-described system of the present invention. As shown in FIG. 2, the first sync word (sync word 1) is accompanied by motion vectors (M1, M2, M3, - - - ) and cosine factors (C1, C2, C3, - - - ) alternately arrayed according to the order from first to ninety-ninth macro blocks. The suffixed numbers represent the spatial positions of respective macro blocks in a given image space shown in FIG. 6. The second sync word (sync word 2) is accompanied by copy information that consists of the motion vectors only arrayed according to an opposed order from ninety-ninth to first macro blocks. In this manner, the bit string of sync word 2 is reversed in the spatial arrangement of macro blocks compared with that of the bit string of sync word 1.

Figure 3:
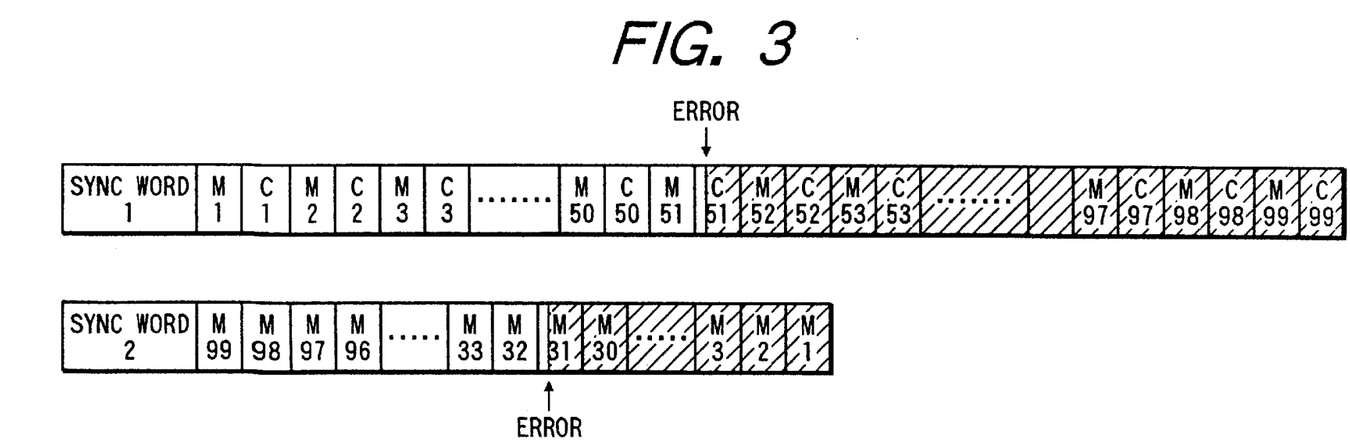
FIG. 3 is a view showing a condition where an error is involved in the bit string shown in FIG. 2.

Adopting the above-described bit string arrangement is effective to suppress the deterioration of image quality in case of an occurrence of an error explained with reference to FIG. 8. FIG. 3 shows an arrangement of a bit string wherein an error is involved. The fifty-first macro block is subjected to an error, and the succeeding macro blocks 52–99 are hatched as macro block information that cannot be decoded.

According to the present embodiment, the copy information comprises the macro blocks disposed according to the opposite order in the spatial arrangement. According to an example of FIG. 3, the thirty-first macro block of the copy information is subjected to an error. Thus, the motion vectors of ninety-ninth to tirty-second macro blocks are correctly decoded and available for replacement. That is, among the correctly decoded macro information of the bit string of sync word 2, the motion vectors corresponding to the fifty-second to ninety-ninth macro blocks can be used for producing predicted images that are replaced for the failed macro block information of the bit string of sync word 1.

Figure 4:
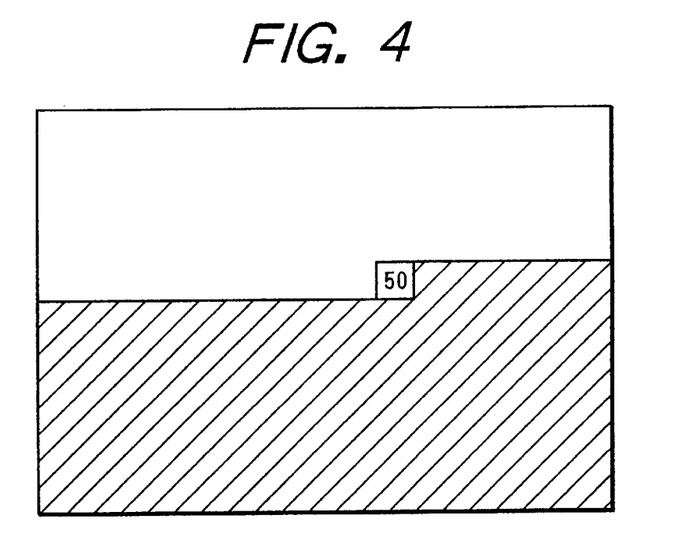
FIG. 4 is a view illustrating a spatial arrangement of a reproduced image comprising a region failed in decoding due to a transmission error but replaced by a corresponding copy information in accordance with the preferred embodiment of the present invention.

FIG. 4 shows a spatial arrangement of an image reproduced by the system shown in FIG. 5 under the circumstances shown in FIG. 3. A white or vacant region represents macro blocks where the image is decoded properly without any error. A hatching region represents macro blocks where the failed image is replaced by the corresponding predicted image. As apparent from a comparison between FIG. 4 and FIG. 9, according to the present invention there is no region where the decoding operation is failed and no copy information is available.

As described above, the possibility that information cannot be accurately decoded due to a transmission error is generally increased in the macro block positioned in the rearward part of the bit string. However, according to the present invention, the copy information corresponding to the failed macro block information is position in the forward part in the bit string. Therefore, it becomes possible to reduce the possibility that the macro block information cannot be decoded due to an error. Thus, the deterioration of image quality can be effectively suppressed.

As apparent from the foregoing description of the preferred embodiment, the present invention makes it possible to increase the replaceability of the copy information for a macro block having a higher possibility of a decoding failure due to an error. This is effective to suppress the deterioration of the image quality.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. An image coding method comprising the steps of:

splitting an input image into a plurality of coding blocks, each serving as units for a coding operation;

performing the coding operation independently in each coding block for variable-length coding information involved in each coding block; and repeating an output operation for outputting all or part of information involved in said coding blocks of said input image in such a manner that an output operation of said coding blocks in an $N^{th}$ (where N is an integer greater than 1) output operation is performed according to an order opposed to an output order in an $(N-1)^{th}$ output operation.

2. An image decoding method comprising the steps of:

decoding an input variable-length coded signal to decode image information involved in each coding block of an input image;

reconstructing a reproduced image based on the decoded image information involved in each coding block; and receiving information relating to said input image plural times from a transmitter, wherein a decoding operation is performed in such a manner that, in a spatial arrangement, an order of coding blocks entered and decoded in an $N^{th}$ (where N is an integer greater than 1) input operation is opposed to an order of coding blocks entered and decoded in an $(N-1)^{th}$ input operation.

3. An image coding method comprising the steps of:

splitting an input image into a plurality of coding blocks, each serving as units for a coding operation;

performing the coding operation independently in each coding block for variable-length coding information involved in each coding block;

outputting a first sync word accompanied by variable-length coded information of said coding blocks, said first sync word being uniquely recognizable by a decoder; and outputting a second sync word accompanied by variable-length coded information of all or part of information involved in the coding blocks of said input image, said second sync word being different from said first sync word, wherein an output operation is performed in such a manner that the information of the coding blocks following said second sync word is output according to an order opposed to an output order of the coding blocks following said first sync word.

4. An image decoding method comprising the steps of:

detecting first and second sync words different from each other and involved in an input bit string;

decoding a variable-length coded information succeeding said first sync word into image information of a plurality of coding blocks; and reconstructing a reproduced image based on the image information of said coding blocks, wherein a decoding operating is performed in such a manner that, in a spatial arrangement, an order of coding blocks decoded after said second sync word is opposed to an order of coding blocks decoded after said first sync word.

5. An image coding apparatus comprising:

a block split means for splitting an input image into a plurality of coding blocks;

a coding means for coding information of the input image contained in said coding blocks;

a variable-length coding means for converting coded information into variable-length codes;

a memory means for memorizing the coded information;

a read control means for controlling said memory means to read out information according to an order opposed to a memorized order;

a sync word putting means for putting a first sync word on a head of the coded information of the input image as well as putting a second sync word different from said first sync word on the information read out from said memory means; and a switching means for selectively outputting said coded information and said information read out from said memory means.

6. An image decoding apparatus comprising:

a sync word detecting means for detecting first and second sync words different from each other and involved in an input signal;

a variable-length decoding means for decoding a variable-length coded string;

a decoding means for reconstructing coding blocks based on information involved in said variable-length decoded string;

a first memory means for memorizing decoded information of coding blocks corresponding to one frame;

a second memory means for memorizing image reproduced one frame before;

a control means for controlling said first and second memory means in such a manner that a writing order and a reading order of coding blocks succeeding said first sync word are opposed to a writing order and a reading order of coding blocks succeeding said second sync word; and a switching means for switching a coding block decoded after detecting said first sync word and a coding block decoded after detecting said second sync word.

* * * * *

UNITED STATES PATENT AND TRADEMARK OFFICE
CERTIFICATE OF CORRECTION

PATENT NO. : 6,091,770
DATED : July 18, 2000
INVENTOR(S) : Koji Imura

It is certified that error appears in the above-indentified patent and that said Letters Patent is hereby corrected as shown below:

[22] change "Jun. 30, 1997" to --Jul. 3, 1997--

Signed and Sealed this

Seventeenth Day of April, 2001

Attest:

NICHOLAS P. GODICI

Attesting Officer

Acting Director of the United States Patent and Trademark Office